United States Patent
Ooi

(10) Patent No.: US 8,634,018 B2
(45) Date of Patent: Jan. 21, 2014

(54) IMAGE PICKUP APPARATUS AND CONTROL METHOD THEREOF

(75) Inventor: Toshiharu Ooi, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 220 days.

(21) Appl. No.: 13/036,477

(22) Filed: Feb. 28, 2011

(65) Prior Publication Data
US 2011/0216221 A1 Sep. 8, 2011

(30) Foreign Application Priority Data
Mar. 3, 2010 (JP) ................................. 2010-046499

(51) Int. Cl.
*H04N 5/235* (2006.01)
*H04N 5/238* (2006.01)
*H04N 5/222* (2006.01)

(52) U.S. Cl.
USPC .... 348/362; 348/364; 348/229.1; 348/333.01

(58) Field of Classification Search
USPC ......... 348/362, 229.1, 333.01, 364, 365, 366; 396/213
See application file for complete search history.

(56) References Cited

U.S. PATENT DOCUMENTS

| 7,783,190 B2 | 8/2010 | Imamura |
| 8,179,450 B2 * | 5/2012 | Sugimoto ................ 348/333.03 |
| 2002/0050518 A1 * | 5/2002 | Roustaei ........................ 235/454 |
| 2005/0206757 A1 | 9/2005 | Itoh |
| 2005/0219395 A1 | 10/2005 | Sugimoto |
| 2005/0270398 A1 * | 12/2005 | Hibino ..................... 348/333.01 |
| 2007/0081081 A1 | 4/2007 | Cheng |
| 2007/0160359 A1 | 7/2007 | Imamura |
| 2009/0161964 A1 | 6/2009 | Tzur et al. |

FOREIGN PATENT DOCUMENTS

| EP | 0720361 (A2) | 7/1996 |
| JP | 63-306782 A | 12/1988 |
| JP | 2001-272710 | * 10/2001 ............... G03B 7/28 |
| JP | 2004-266362 (A) | 9/2004 |
| JP | 2005-269452 A | 9/2005 |
| JP | 2006-319406 A | 11/2006 |
| JP | 2007-178576 A | 7/2007 |
| JP | 2009-081808 A | 4/2009 |

* cited by examiner

*Primary Examiner* — Nhan T Tran
(74) *Attorney, Agent, or Firm* — Foley & Lardner LLP

(57) ABSTRACT

An exemplary aspect of the invention is an image pickup apparatus including a sensor unit including a plurality of pixels; an exposure control unit that controls exposure by a feedback control based on image data acquired by the sensor unit; and a display unit that displays an image having undergone exposure control. During a time period from a point immediately after activation of the image pickup apparatus until a point when an image is displayed on the display unit, the sensor unit executes temporary loading of a part of the image data, and the exposure control unit sets an optimum exposure value based on the image data temporarily loaded.

11 Claims, 4 Drawing Sheets

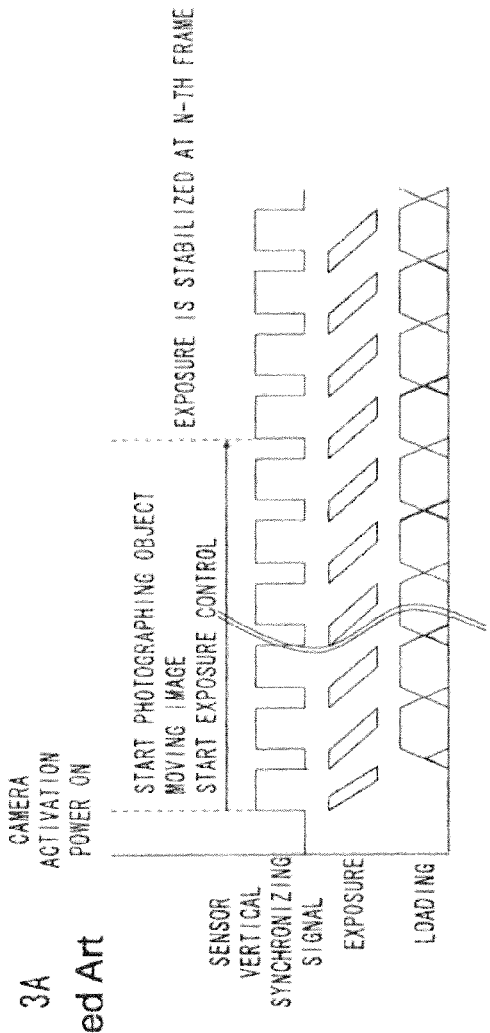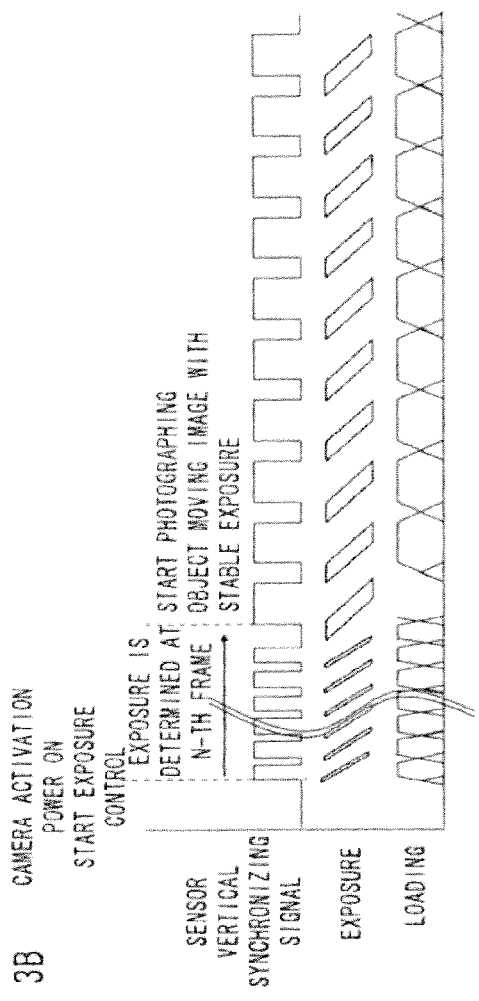

IMAGE PICKUP APPARATUS AND CONTROL METHOD THEREOF

CROSS-REFERENCE TO RELATED APPLICATIONS

This application is based upon and claims the benefit of priority from Japanese patent application No. 2010-046499, filed on Mar. 3, 2010, the disclosure of which is incorporated herein in its entirety by reference.

BACKGROUND

1. Field of the Invention

The present invention relates to an image pickup apparatus that controls exposure by a feedback control, and to a control method thereof.

2. Description of Related Art

A digital camera continuously captures images in advance and displays the captured images on a display device in order to determine exposure and focus prior to actual photographing.

During the display of a confirmation image before photographing, a brightness level of a subject is detected and a feedback control for controlling an exposure state is carried out to set the brightness level to a certain level. In the feedback control, one cycle (1 field=1 frame) of a vertical synchronizing signal (VD: Vertical Driving) from a sensor is required for one feedback control. Image data for one screen is loaded and transferred based on the vertical synchronizing signal.

Upon activation by turning on a camera, or at the start of the display of a confirmation image before photographing after actual photographing, an exposure control is generally started using a predetermined reference value or exposure information obtained in the preceding actual photographing.

Japanese Unexamined Patent Application Publication No. 2004-266362 discloses a technique in which exposure is feedback-controlled while a confirmation moving image before photographing is being displayed. In the feedback control, an automatic exposure (AE) evaluation value of an image output from an image-capturing device is referred to, and a charge storage time and the like of the image-capturing device are corrected in a direction in which exposure approaches a correct value.

SUMMARY

The present inventor has found a problem that, in the related art method, a feedback control is started from the predetermined reference value or the exposure information obtained in actual photographing. This causes a problem that when the brightness level of a subject is extremely high (bright) or low (dark), it takes a long time to stabilize the exposure. Thus, up to now, it has been strongly desired to shorten a time period from power-on of a camera until a point when the exposure value is set to a correct value.

A first aspect of the present invention is an image pickup apparatus including: a sensor unit including a plurality of pixels; an exposure control unit that controls exposure by a feedback control based on image data acquired by the sensor unit; and a display unit that displays an image having undergone exposure control, in which during a time period from a point immediately after activation of the image pickup apparatus until a point when the image is displayed on the display unit, the sensor unit executes temporary loading of a part of the image data, and the exposure control unit sets an optimum exposure value based on the image data temporarily loaded.

A second aspect of the present invention is a method of controlling an image pickup apparatus that controls exposure by a feedback control based on image data acquired by a sensor unit including a plurality of pixels, the method including: during a time period from a point immediately after activation of the image pickup apparatus until a point when an image is displayed on a display unit, executing, by the sensor unit, temporary loading of a part of the image data; and setting, by an exposure control unit, an optimum exposure value based on the image data temporarily loaded.

In the above-mentioned aspects of the present invention, the sensor unit executes temporary loading of a part of the image data during the time period from the point immediately after activation of the image pickup apparatus until the point when an image is displayed on the display unit, thereby shortening a time period for loading image data as compared to the related art. Therefore, a time period for displaying an image on the display unit can be dramatically shortened.

According to an aspect of the present invention, it is possible to provide an image pickup apparatus capable of shortening a time period from a point immediately after activation of the image pickup apparatus until a point when an image is displayed, and a control method thereof.

BRIEF DESCRIPTION OF THE DRAWINGS

The above and other aspects, advantages and features will be more apparent from the following description of certain embodiments taken in conjunction with the accompanying drawings, in which:

FIG. 3A is a diagram showing a control of a camera according to a related art;

FIG. 3B is a diagram for illustrating effects of the image pickup apparatus according to an embodiment of the present invention, and for showing a control of a camera.

DETAILED DESCRIPTION

An embodiment of the present invention will be described in detail below with reference to the accompanying drawings. In this embodiment, the present invention is applied to an image pickup apparatus that controls exposure by a feedback control.

In this embodiment, temporary loading is carried out during a time period from a point immediately after activation of the image pickup apparatus until a point when an image is displayed on a display device. In the temporary loading, a part of image data is loaded. Specifically, not the entire pixel data but a part of the pixel data is obtained by executing one of a thinning processing for reading out data from a part of the entire pixels and a cutting-out processing for cutting out and extracting a part of the image data from the entire pixel data, or a combination thereof. The use of a part of the pixel data for exposure control can dramatically shorten a time period from the point immediately after activation of the image pickup apparatus until the point when the exposure is stabilized.

Figure 1:
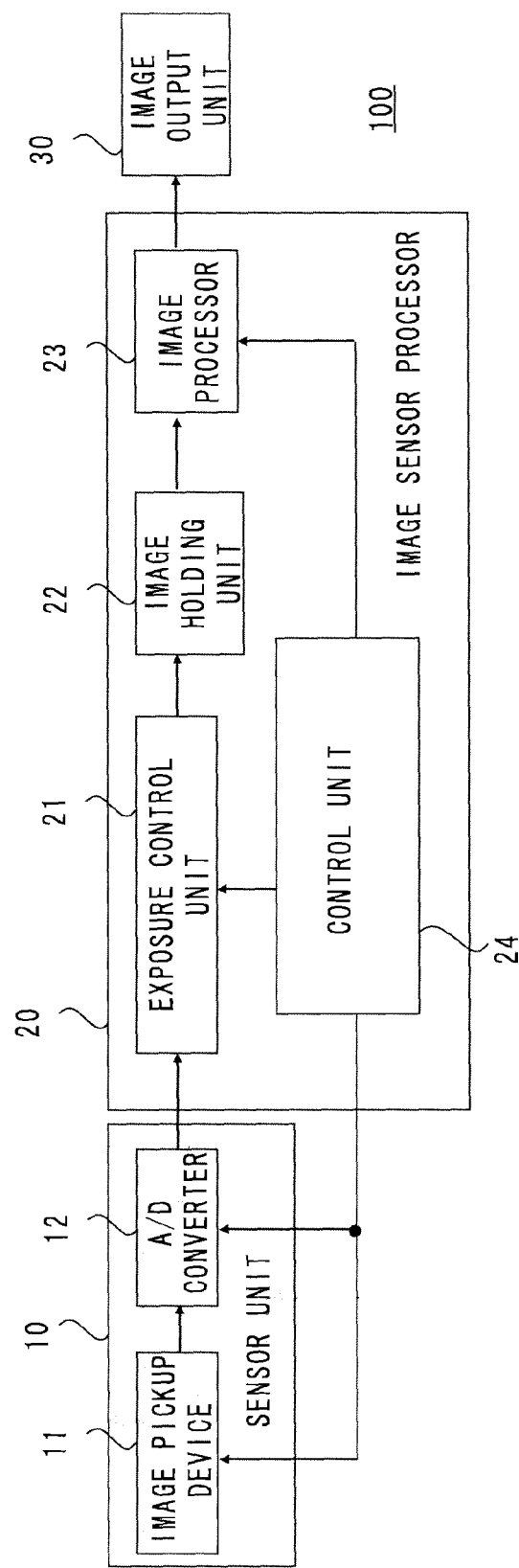
FIG. 1 is a block diagram showing an image pickup apparatus according to an embodiment of the present invention.

FIG. 1 is a block diagram showing the image pickup apparatus according to an embodiment of the present invention. As shown in FIG. 1, an image pickup apparatus 100 includes a sensor unit 10, an image sensor processor (ISP) 20, and an image output unit 30.

The sensor unit 10 is composed of a CCD (Charge Coupled Device), a CMOS (Complementary Metal Oxide Semiconductor), or the like. The sensor unit 10 includes an image pickup device 11 that captures an image, and an analog-digital converter (A/D converter) 12 that converts the image captured by the image pickup device 11 from an analog signal to a digital signal.

The image processor 20 includes an exposure control unit 21, an image holding unit 22, an image processor 23, and a control unit 24. The exposure control unit 21 controls exposure based on image data from the sensor unit 10. The image holding unit 22 temporarily holds the image data from the sensor unit 10. The image processor 23 receives, from the control unit 24, an optimum white balance for the image data held in the image holding unit 22, processes the image data to achieve the white balance, and outputs the processed image data to the image output unit 30.

The control unit 24 sets a shutter speed (exposure time), a gain, an optimum exposure value (lens aperture (F value)), and the like, which are calculated by the exposure control unit 21, to the image pickup device 11 and the A/D converter 12.

In this case, the control unit 24 controls the sensor unit 10 to execute temporary loading of a part of the image data. Further, the control unit 24 controls the exposure control unit 21 to set an optimum exposure value based on the temporarily loaded image data.

As described above, the temporary loading is carried out by executing the thinning processing for thinning out and reading out pixels from the entire pixels and/or the cutting-out processing for cutting out and reading out data from the entire pixel data.

The image pickup apparatus according to this embodiment is configured to be externally switchable between the thinning processing and the cutting-out processing. Specifically, a user can change the setting between the thinning processing and the cutting-out processing depending on the intended use.

For instance, in the case where an image whose exposure is proper in all regions of the image, such as a scenery image, is intended to be obtained, the thinning processing is selected. Meanwhile, in the case where an image in which a relatively central portion is emphasized, such as a portrait, is intended to be obtained, the cutting-out processing is selected. Thus, the exposure control can be executed most effectively.

Figure 2:
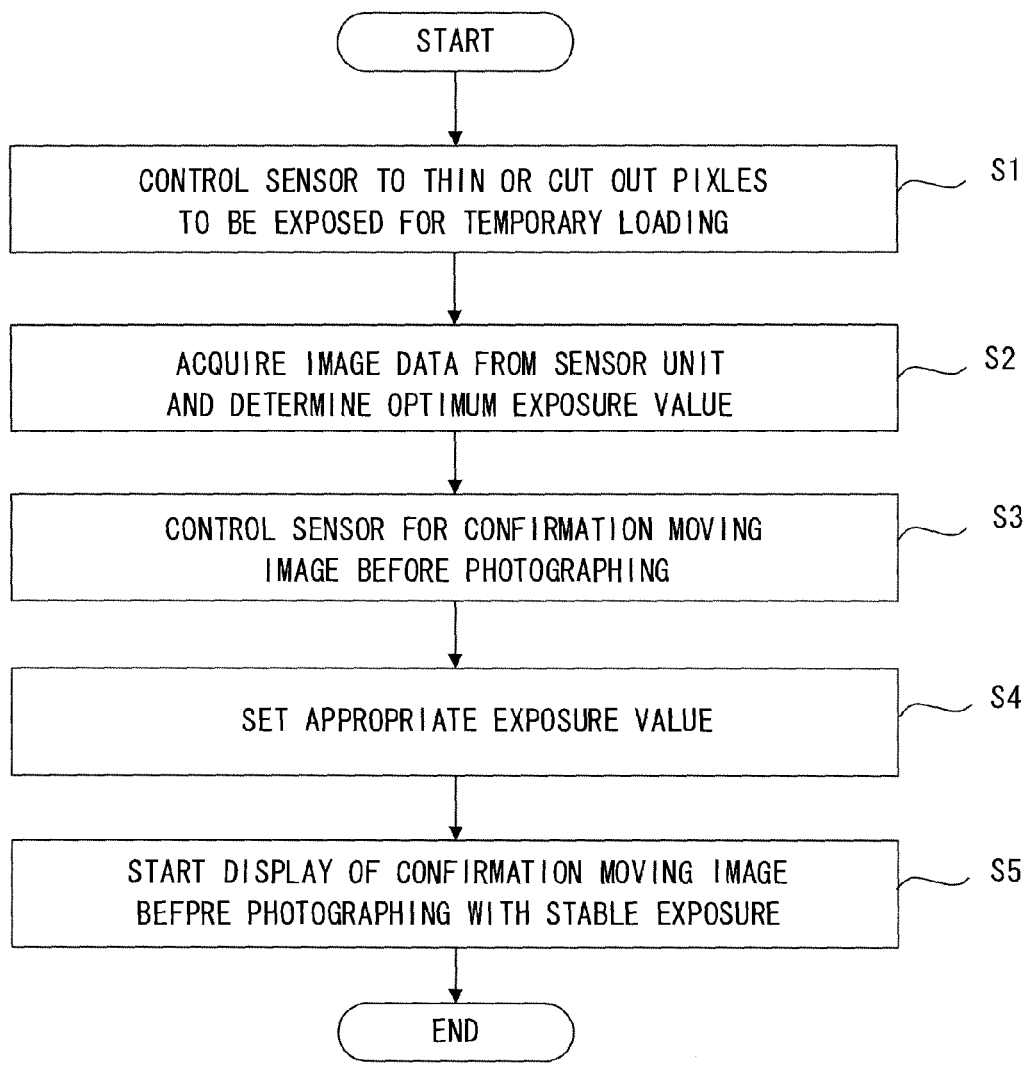
FIG. 2 is a flowchart showing a method of controlling an image pickup apparatus according to an embodiment of the present invention.

FIG. 2 is a flowchart showing a method of controlling the image pickup apparatus according to this embodiment. As shown in FIG. 2, upon power-on, the sensor is first controlled to thin or cut out pixels to be exposed, for temporary loading (step S1). In this case, the sensor unit 10 is configured by the control unit 24 so as to acquire image data only from a part of the entire pixels.

Next, an optimum exposure value is determined by a normal feedback control (step S2). In this case, the method of determining the optimum exposure value is not particularly limited, and any method may be used. In this embodiment, a part of the entire pixel data is read out for exposure control. Accordingly, when a half of the pixel data is used, for example, a time period for reading out the data is reduced by half, so that a time period for stabilizing the exposure can be shortened.

After the optimum exposure value is determined, the sensor unit 10 is restored to a normal state for a confirmation moving image before photographing (step S3). After that, an appropriate exposure value is set (step S4). The display of the confirmation moving image before photographing is started with stable exposure (step S5).

In this embodiment, an image is displayed on a screen after the exposure is stabilized. Accordingly, even when photographing is performed immediately after the display of the confirmation image before photographing is started, an image whose exposure is stabilized can be obtained.

FIGS. 3A and 3B are diagrams each illustrating effects of the image pickup apparatus according to this embodiment. FIG. 3A shows a control of a camera according to a related art, and FIG. 3B shows a control of a camera according to this embodiment. As shown in FIG. 3A, upon activation of the camera, the exposure control is started and the exposure is stabilized at an N-th frame.

Like in the related art, N number of frames are required to stabilize the exposure also in this embodiment. However, since a part of the pixel data is read out and used for exposure control in order to temporarily load the image data, the time period of one frame is shortened as compared to the related art. As a result, the timing at which the N-th frame is ended is dramatically earlier than that of the related art.

In the case of a camera having a resolution of 120000 pixels, for example, an optimum exposure value can be obtained using a small percent of the pixel data. The time period for reading out the pixel data is reduced to one-several tenths of the time period for reading out the entire pixel data. Furthermore, the time period for obtaining an optimum exposure value is reduced to a fraction of that of the related art.

Figure 4:
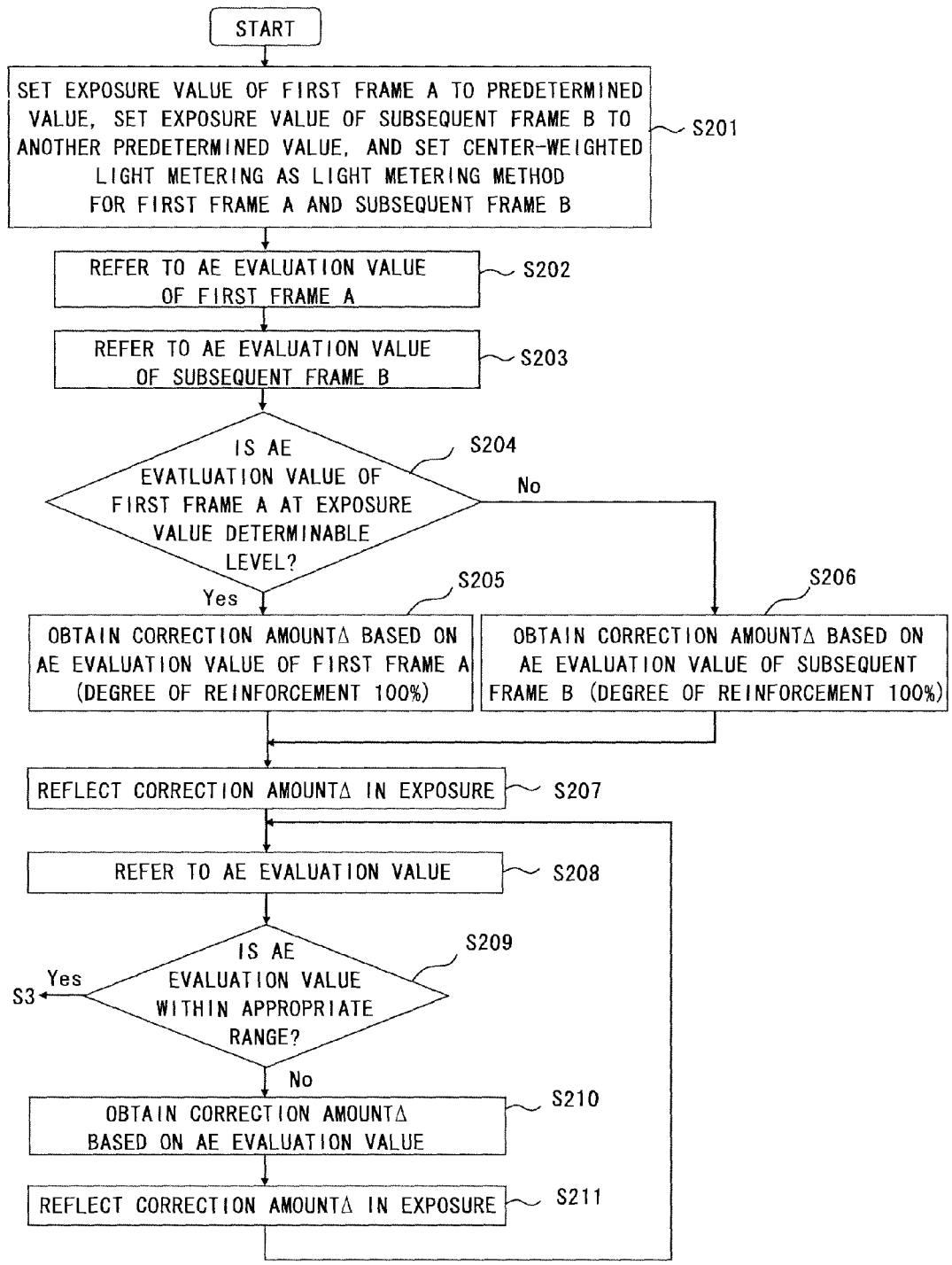
FIG. 4 is a flowchart showing details of an exposure control.

Here, an exemplary method of obtaining an optical exposure value in step S2 is described. FIG. 4 is a flowchart showing details of the exposure control.

As shown in FIG. 4, an exposure value for a first frame A is set to a predetermined value, and an exposure value for a subsequent frame B is set to another predetermined value. These exposure values are set depending on a charge storage time of the image pickup device.

The following description is made assuming that the exposure value for the first frame A is set to a large predetermined value (exposure time T=1/30 sec; aperture released), and the exposure value for the subsequent frame B is set to a small predetermined value (exposure time T=1/2000 sec; aperture released).

Regardless of the setting by the user, the control unit 24 employs center-weighted light metering as a light metering method when an AE evaluation value is extracted from the confirmation moving image before photographing. Further, regardless of the setting by the user, the control unit 24 sets a predetermined value, e.g., a value corresponding to the ISO sensitivity 100, as a gain (step S201).

Next, an AE evaluation value extracted from the first frame A of the confirmation moving image before photographing and an AE evaluation value extracted from the frame B subsequent to the first frame A are referred to (steps S202 and S203).

The control unit 24 determines whether the AE evaluation value of the first frame A is at a predetermined exposure value determinable level (a level corresponding to an AD output value of 3200 or lower) (step S204). When the AE evaluation value is at the predetermined exposure value determinable level (Yes in step S204), the subject brightness is regarded as relatively low, and a correction amount A is obtained based on the AE evaluation value of the first frame A, which is obtained at large exposure, and its exposure. Meanwhile, when the AE evaluation value of the first frame A exceeds the predetermined exposure value determinable level (No in step S204), the subject brightness is regarded as relatively high, and the correction amount Δ is obtained based on the AE evaluation value of the subsequent frame B, which is obtained at small exposure, and its exposure.

To increase the feedback response speed, the correction strength is increased. Specifically, the correction amount Δ obtained in steps 205 and 206 is 100% (a correction strength of 100%) of the value which allows the exposure to instantly agree with the correct value.

Next, the control unit 24 changes the charge storage time of the image pickup device 11 by reflecting the correction amount Δ thus obtained in the exposure (step S207).

Subsequently, the control unit 24 refers to the AE evaluation value extracted (step S208), and the correction amount Δ is obtained based on the AE evaluation value (step S209). The control unit 24 performs a control to change the charge storage time of the image pickup device 11 by the obtained correction amount Δ (step S210). Then, the correction amount Δ is reflected in the exposure (step S211), and the process from step S208 is repeated. In this manner, the optimum exposure value can be determined.

In this embodiment, not the entire pixel data but a part of the pixel data is thinned or cut out and read out from the sensor unit 10. Accordingly, the time period of one frame can be shortened as compared to the case where an optimum exposure value is obtained by a feedback control using the entire pixel data as in the related art. Consequently, the time period for stabilizing the exposure, i.e., the time period from power-on until the point when an image is displayed on the display unit can be dramatically shortened.

While the invention has been described in terms of several embodiments, those skilled in the art will recognize that the invention can be practiced with various modifications within the spirit and scope of the appended claims and the invention is not limited to the examples described above. For example, the processing of the image sensor processor 20 can be implemented by a program. The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Further, the scope of the claims is not limited by the embodiments described above.

Furthermore, it is noted that, Applicant's intent is to encompass equivalents of all claim elements, even if amended later during prosecution.

What is claimed is:

1. An image pickup apparatus comprising:
a sensor unit including a plurality of pixels;
an exposure control unit that controls exposure by a feedback control based on image data acquired by the sensor unit; and
a display unit that displays an image having undergone exposure control,
wherein, during a time period from a point immediately after activation of the image pickup apparatus until a point when said image is displayed on the display unit, the sensor unit executes temporary loading of a part of the image data, and the exposure control unit sets an optimum exposure value based on the image data temporarily loaded, and
wherein said display unit displays said image only after a stable exposure has been reached based on said temporary loading of a part of the image data and said setting an optimum exposure value based on the image data temporarily loaded.

2. The image pickup apparatus according to claim 1, wherein the temporary loading is executed by a thinning processing for reading out data from a part of pixels among the entire pixels and/or by a cutting-out processing for cutting out and extracting a part of the image data from the entire pixel data.

3. The image pickup apparatus according to claim 2, wherein the thinning processing and the cutting-out processing are configured to be externally switchable.

4. The image pickup apparatus according to claim 2, wherein the thinning processing is executed by reading out data every N (N is a natural number) columns and/or every M (M is a natural number) rows from the entire pixels.

5. The image pickup apparatus according to claim 2, wherein in the cutting-out processing for cutting out and extracting a part of the image data from the entire pixel data, pixel data at a central portion of a screen is cut out in a rectangular shape.

6. The image pickup apparatus according to claim 1,
wherein the exposure control unit uses the image data obtained by said temporary loading, and
wherein a time period of said temporary loading is shorter than a time period of a normal loading, said time period of the temporary loading indicating a required time period per one image data obtained by said temporary loading, and said time period of the normal loading indicating a required time period per one image data obtained by said normal loading.

7. A method of controlling an image pickup apparatus that controls exposure by a feedback control based on image data acquired by a sensor unit including a plurality of pixels, the method comprising:
during a time period from a point immediately after activation of the image pickup apparatus until a point when an image is displayed on a display unit,
executing temporary loading of a part of the image data, and
setting an optimum exposure value based on the image data temporarily loaded; and
once a stable exposure has been reached based on said executing and said setting, displaying said image on said display unit.

8. The method of controlling an image pickup apparatus according to claim 7, wherein the temporary loading is executed by a thinning processing for reading out data from a part of pixels among the entire pixels and/or by a cutting-out processing for cutting out and extracting a part of the image data from the entire pixel data.

9. The method of controlling an image pickup apparatus according to claim 8, wherein the thinning processing and the cutting-out processing are configured to be externally switchable.

10. The method of controlling an image pickup apparatus according to claim 8, wherein the thinning processing is executed by reading out data every N (N is a natural number) columns and/or every M (M is a natural number) rows from the entire pixels.

11. The method of controlling an image pickup apparatus according to claim 8, wherein in the cutting-out processing for cutting out and extracting a part of the image data from the entire pixel data, pixel data at a central portion of a screen is cut out in a rectangular shape.

* * * * *